Sept. 4, 1962  H. H. HARADA  3,052,775
GOVERNOR MECHANISM
Filed Aug. 10, 1960  2 Sheets-Sheet 1
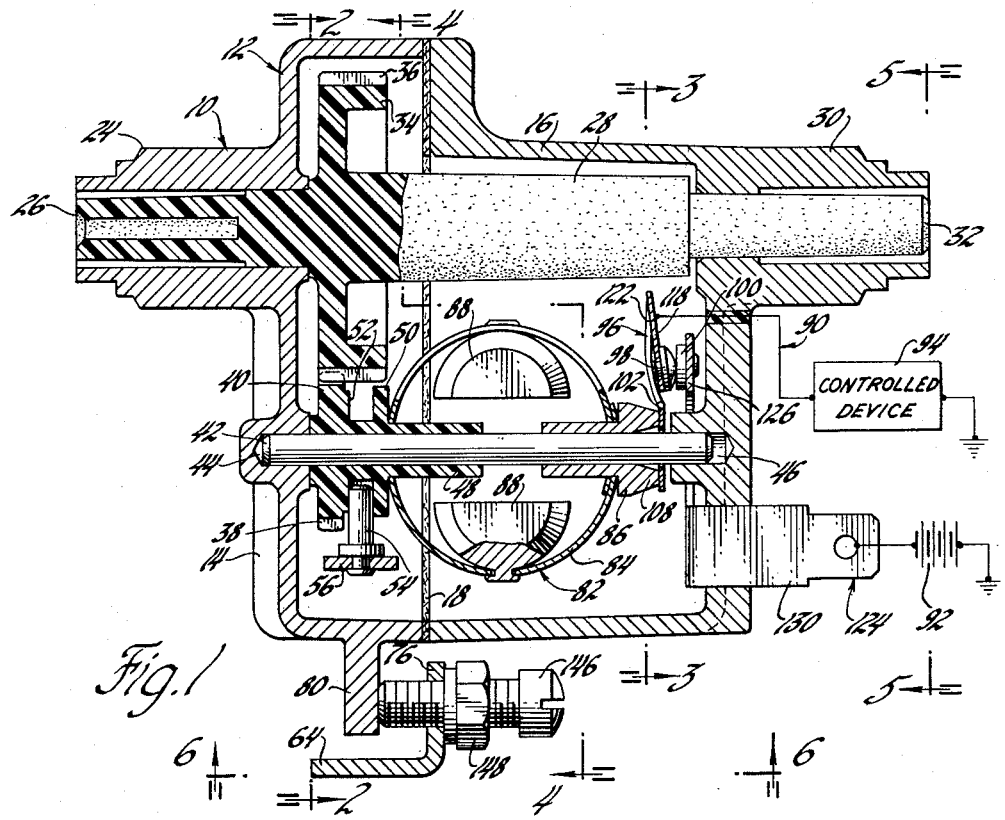
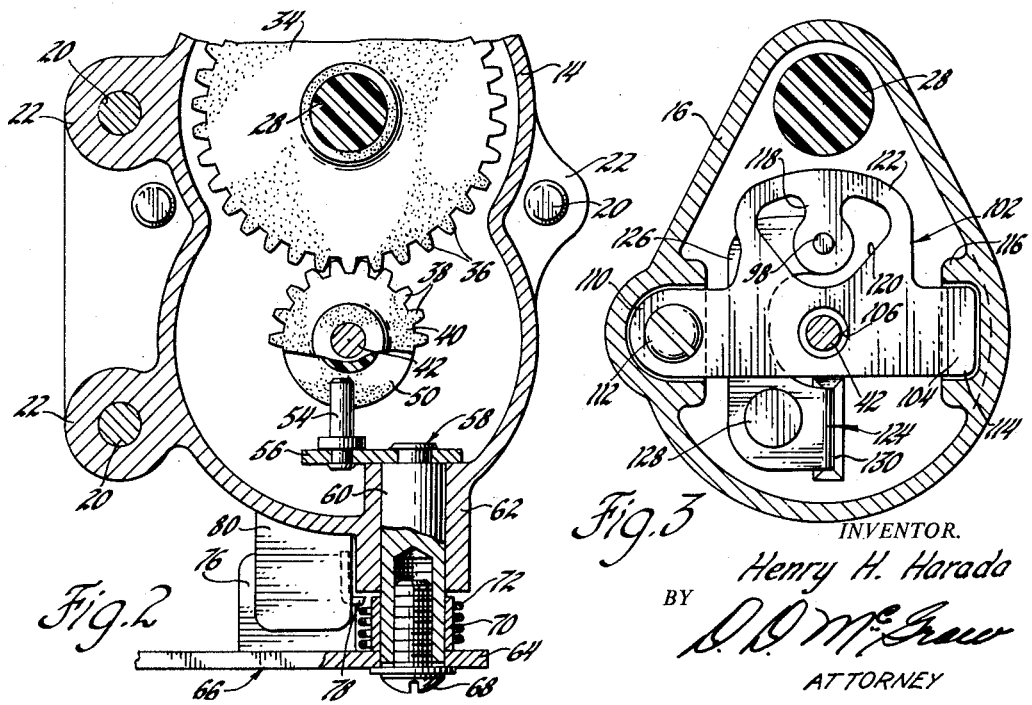
INVENTOR.
Henry H. Harada
BY
ATTORNEY

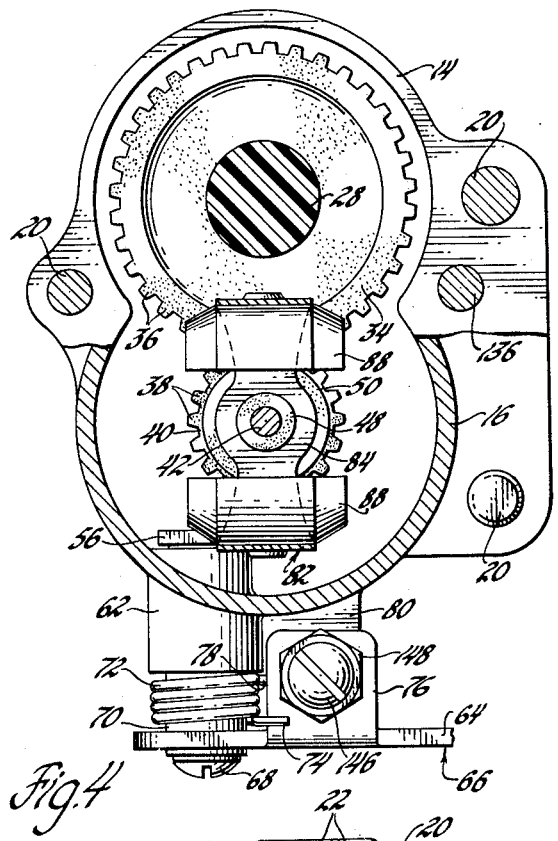

United States Patent Office 3,052,775
Patented Sept. 4, 1962

3,052,775
GOVERNOR MECHANISM
Henry H. Harada, Grand Blanc, Mich., assignor to General Motors Corporation, Detroit, Mich., a corporation of Delaware
Filed Aug. 10, 1960, Ser. No. 48,705
2 Claims. (Cl. 200—80)

The invention relates to a governor mechanism and particularly to one which senses speed of a rotatable element and acts to control a circuit in accordance with that speed. The mechanism preferably controls a circuit, which may be of the electrical type, with a speed hysteresis effect. Thus, for example, the circuit being controlled may be opened at one speed and closed at another speed different from that at which it is opened. The mechanism may be utilized to control various devices having need of such control. An example of such devices is an automatic transmission for motor vehicles.

The mechanism is preferably designed and manufactured so as to fit in the speedometer drive line of motor vehicles such as automobiles and trucks. It is compact so as to occupy a minimum amount of space while providing accurate speed control. The speeds at which it acts may be readily adjusted to fit the needs of the particular installation.

In the drawings:

FIGURE 1 is a cross section view with parts broken away of a mechanism embodying the invention and including a diagrammatic representation of a circuit which may be controlled by the mechanism.

FIGURE 2 is a partial section view of the mechanism of FIGURE 1 taken in the direction of arrows 2—2 of that figure.

FIGURE 3 is a section view of the mechanism of FIGURE 1 taken in the direction of arrows 3—3 of that figure.

FIGURE 4 is a section view of the mechanism of FIGURE 1 taken in the direction of arrows 4—4 of that figure.

FIGURE 5 is an end view of the mechanism of FIGURE 1 taken in the direction of arrows 5—5 of that figure.

FIGURE 6 is a view of a portion of the mechanism of FIGURE 1 taken in the direction of arrows 6—6 of that figure.

FIGURE 7 shows graphically the function of the mechanism when increasing speed and having the mechanism set to control the circuit at various speed settings.

FIGURE 8 is similar to FIGURE 7 and graphically shows the operation of the mechanism under decreasing speed conditions.

The mechanism 10 embodying the invention has a housing 12 including a frame section 14 and cover section 16 separated and sealed by a gasket 18 and secured together by several screws 20 passing through appropriate bosses 22. Frame section 14 is provided with a boss 24 in which is journaled the input end 26 of the drive shaft 28. Cover section 16 is provided with a boss 30 in which is journaled the output end 32 of the drive shaft 28. Drive shaft 28 may be suitably connected in the speedometer drive line of a motor vehicle if desired so that drive to the speedometer passes through the shaft. In other installations it may be desirable to furnish a separate drive from some other portion of the vehicle.

Drive gear 34 is either integrally formed with or secured to drive shaft 28 so that it is mounted in the position shown in the housing frame section 14. Gear teeth 36 of gear 34 preferably extend in the axial direction of shaft 28 a sufficient distance to provide a long engagement area with teeth 38 of a driven gear 40. This will permit teeth 38 to be engaged at all times with teeth 36 while gear 40 is moved axially for purpose to be described. Gear 40 is mounted to rotate on a governor shaft 42 which has its ends received in bearing recesses 44 and 46 respectively formed in frame section 14 and cover section 16. The number of gear teeth 38 is preferably less than the number of teeth 36 so that an overdrive of gear 40 from drive shaft 28 is obtained.

Gear 40 has an axially extending quill 48 through which shaft 42 is received. A flange 50 formed on quill 48 and spaced from the toothed section of gear 40 cooperates with that section to provide a groove 52. Crankpin 54 is received in groove 52 and is mounted on crankarm 56 which forms a part of the crankshaft assembly 58. Assembly 58 includes the shaft 60 which extends through the boss 62 formed in frame section 14 and is attached to the control arm section 64 of the bracket assembly 66 by means of screw 68. A bushing 70 is positioned on shaft 60 externally of boss 62 and intermediate the outer end of that boss and control arm 64 and has a coil torsion spring 72 received about it. One end 74 of spring 72 is bent radially outward so as to engage ear 76 and the other spring end 78 extends radially outward and axially of bushing 70 and engages flange 80, which is formed on the outer portion of frame section 14. Spring 72 thus acts on control arm 64 through ear 76 to bias pin 54 to the left as seen in FIGURE 1. Bracket assembly 66 may be moved as will be described in order to control the governor weight assembly of the mechanism.

The governor weight assembly 82 is illustrated as being made in a manner generally similar to the governor which is the subject of United States application S.N. 632,541, filed January 4, 1957, in the name of William L. Sheppard, now abandoned. It includes a governor spring 84 which is formed into a closed loop with the spring ends overlapping. Quill 48 extends through an opening in the center of the spring positioned diametrically opposite the spring ends when the spring is looped. The spring ends have aligned openings in which bushing 86 is received. This bushing is also mounted on shaft 42 and is in spaced relation to gear 40. It may rotate relative to shaft 42 and is slidably movable thereon under influence of the governor weight assembly 82. Governor weights 88 are attached to spring 84 internally of the loop and on a diameter of the loop which is normal to the axis of shaft 42 and the loop diameter on which that shaft axis lies. Since spring 84 tends to become a straight element its normal reaction is to resist the outward movement of weights 88 as the spring is rotated. The spring is rotatably driven through its frictional engagement with quill 48 and flange 50. Movement of gear 40 toward the right, as seen in FIGURE 1, will preload spring 84 so that the weights 88 are held a predetermined distance outwardly from the axis of shaft 42. This adjustment of gear 40 permits the selection of the desired speed at which the governor will operate open or close the circuit being controlled.

The circuit 90 which is controlled by the mechanism may include a source 92 of electrical energy and a controlled device 94 such as an automatic transmission in an automobile. The circuit also includes the switch 96, which is opened and closed under the influence of the governor weight assembly 82. Switch 96 includes movable contact 98 and a cooperating contact 100. Contact 98 is mounted on switch spring 102 which is contained within the housing cover section 16. The base 104 of spring 102 has opening 106 through which governor shaft 42 extends. The end 108 of bushing 86 extending in the opposite direction from gear 40 is maintained in engagement with spring base 104 by the action of governor spring 84. Spring base 104 has a lug 110 through which an attaching screw 112 is received to mount spring 102 to the cover section 16 at one side of the spring. Another lug 114 on spring 102 on the opposite side of opening 106 from lug 110 is received within a guide boss 116 formed on the inside of cover section 16 so that spring 102 is permitted to move axially along shaft 42 to a limited extent by spring cantilever action while the spring is prevented from rotating either about the axis of shaft 42 or screw 112. A spring arm mount 118 has contact 98 secured thereto and is formed by providing a generally C-shaped aperture 120 in the spring section 122. In the free position, spring section 122 is bent out of the plane of spring base 104 toward the side of the spring engaged by bushing 86 so that the spring arm mount 118 for contact 98 extends out of the plane of spring base 104 on the side of spring 102 opposite that engaged by bushing 86. This arrangement provides a snap action spring construction which permits the desired hysteresis effect.

Contact 100 is mounted on a terminal 124 which has an arm 126 mounted within cover section 16 so that contact 100 is in contactable relation with contact 98. A rivet or screw 128 is provided for mounting terminal 124 to cover section 16. Terminal 124 also has another arm 130 which extends through the end of cover section 16 and may be suitably connected in circuit 90.

Screw 112, which mounts the spring 102 inside the cover section 16, extends through the cover section and electrically connects with jumper plate 132. Nut 134 may be provided to hold jumper plate 132 in place. A screw 136 in jumper plate 132 may be utilized to connect the jumper plate in the circuit 90. Circuit 90 is therefore solidly connected to each of the contacts 98 and 100 and is closed when these contacts are engaged and opened when they are disengaged.

The line 138 on graph of FIGURE 7 indicates the points at which switch 96 is opened as speed is increased depending on the speed setting position of gear 40 as controlled by crankshaft assembly 58 and bracket 66. The center line 140 of control arm 64 is illustrated in FIGURE 6 at its zero degree position when it is rotated in a direction to move arm 40 to the right as seen in FIGURE 1. It may assume the position illustrated for an opening of A° or more. If the governor mechanism is utilized in conjunction with the control linkage for the engine of a motor vehicle so as to vary the upshift and downshift points of an automatic transmission in accordance with throttle opening, A° may represent the opening at engine idle conditions and B° may represent the movement of control arm 64 between idle and full throttle condition. Thus control arm centering line 140 will be in the position indicated by line 142 at engine idle and at position indicated by line 144 at full throttle. A stop screw 146 may be threaded through ear 76 and control arm 64 and locked in position by lock nut 148. The end of screw 146 may engage flange 80 so as to prevent arm 64 from moving toward the zero position beyond line 142. This would have the effect of, for example, maintaining switch 96 in the closed position until the vehicle speed reaches 20 m.p.h. regardless of throttle opening. It is apparent that in operation the mechanism will open switch 96 at some speed between 20 m.p.h. and, for example, 79 m.p.h., depending upon the position of control arm 64.

When the vehicle is decreasing speed, line 150 of the graph of FIGURE 8 indicates the points at which switch 96 will open, depending upon the position of control arm 64. In the example graphically illustrated switch 96 acts to provide a hysteresis effect equivalent to a 10 m.p.h. range. Thus at one position of control arm 64, the switch will open when a desired speed is reached as the vehicle is accelerated and will remain open as the vehicle is decelerated until vehicle speed of 10 m.p.h. less than the opening speed is reached. At this time the switch will snap closed and circuit 90 be completed.

What is claimed is:

1. A speed hysteresis governor assembly comprising, a housing, a rotatable drive shaft extending through and journaled in said housing and having a drive gear thereon, a driven gear meshing in driven relationship with said drive gear, a governor shaft secured in said housing and having said driven gear rotatably and slidably mounted thereon, a bushing slidably received on said governor shaft in axially spaced relation to said driven gear, weighted spring governor means rotatably drivable by said driven gear and connected to said bushing to reflect governor speed by sliding movement of said bushing on said governor shaft, means for slidably adjusting said driven gear on said governor shaft for adjusting said weighted spring governor means, a snap action switch assembly having a first electrical terminal engaging said bushing and a second electrical terminal secured to said housing and aligned and engageable electric contacts on said terminals, said contacts opening and closing in accordance with governor controlled sliding movement of said bushing acting on said first electrical terminal, one of said terminals having an over-center spring providing speed hysteresis for opening and closing said contacts at different speeds.

2. A governor mechanism comprising a housing having a governor shaft mounted therein, a governor drive gear slidably mounted on said governor shaft, a governor spring and weight assembly driven by said drive gear and rotatable about said governor shaft, a bushing connected with said governor spring and weight assembly for slidable movement on said governor shaft in accordance with governor speed, a first contact operatively secured to said housing, a second contact in engageable relation with said first contact, and secured in said housing and movable by sliding movement of said bushing to engage and disengage said contacts whereby a circuit containing said contacts is opened and closed under influence of said governor weight and spring assembly, and means for slidably moving said drive gear for adjusting the speed at which said contacts are opened and closed.

References Cited in the file of this patent

UNITED STATES PATENTS

| | | |
|---|---|---|
| 1,611,340 | David et al. | Dec. 21, 1926 |
| 2,624,819 | Spina et al. | Jan. 6, 1953 |
| 2,906,833 | Long et al. | Sept. 29, 1959 |
| 2,943,166 | May | June 28, 1960 |
| 2,951,694 | Scheiter | Sept. 6, 1960 |